(12) United States Patent
Chae et al.

(10) Patent No.: US 10,775,794 B2
(45) Date of Patent: Sep. 15, 2020

(54) FOLLOWING SYSTEM FOR MOBILE ROBOT TO FOLLOW MOVING OBJECT

(71) Applicant: HANWHA DEFENSE CO., LTD., Changwon-si (KR)

(72) Inventors: HeeSeo Chae, Changwon-si (KR); JaeChan Park, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 377 days.

(21) Appl. No.: 15/580,752

(22) PCT Filed: Sep. 2, 2015

(86) PCT No.: PCT/KR2015/009215
§ 371 (c)(1),
(2) Date: Dec. 8, 2017

(87) PCT Pub. No.: WO2017/034062
PCT Pub. Date: Mar. 2, 2017

(65) Prior Publication Data
US 2018/0143640 A1    May 24, 2018

(30) Foreign Application Priority Data
Aug. 26, 2015   (KR) .......... 10-2015-0120550

(51) Int. Cl.
*G05D 1/00* (2006.01)
*G05D 1/02* (2020.01)
(Continued)

(52) U.S. Cl.
CPC ......... *G05D 1/0212* (2013.01); *G05D 1/0016* (2013.01); *G05D 1/0022* (2013.01); *G05D 1/028* (2013.01); *G05D 1/0253* (2013.01); *G05D 1/0255* (2013.01); *G06K 9/4604* (2013.01); *H04N 5/232* (2013.01);
(Continued)

(58) Field of Classification Search
CPC .. G05D 1/0016; G05D 1/0022; G05D 1/0212; G05D 1/0253; G05D 1/0255; G05D 1/028; G05D 2201/0209; H04N 5/232; H04N 5/23238; H04N 5/23296;
(Continued)

(56) References Cited

U.S. PATENT DOCUMENTS 5,323,470 A    6/1994   Kara et al.
6,663,341 B2   12/2003  Evans et al.
(Continued)

FOREIGN PATENT DOCUMENTS

JP    9-128056 A      5/1997
JP    2006-185239 A   7/2006
(Continued)

*Primary Examiner* — Robert T Nguyen
(74) *Attorney, Agent, or Firm* — Sughrue Mion, PLLC (57) ABSTRACT

A following system according to an embodiment, in which a mobile robot follows a moving object, includes a first camera and a mobile robot. The first camera is worn by the moving object and is used to photograph a scene in front of the moving object. The mobile robot includes a second camera for photographing a scene in front of the mobile robot, and acquires a following path according to a first front image from the first camera and a second front image from the second camera.

9 Claims, 9 Drawing Sheets

(51) Int. Cl.
*H04N 5/232* (2006.01)
*H04N 5/262* (2006.01)
*G06K 9/46* (2006.01)
*H04N 5/247* (2006.01)

(52) U.S. Cl.
CPC ...... *H04N 5/23238* (2013.01); *H04N 5/23296* (2013.01); *H04N 5/247* (2013.01); *H04N 5/262* (2013.01); *G05D 2201/0209* (2013.01); *Y10S 901/01* (2013.01); *Y10S 901/47* (2013.01)

(58) Field of Classification Search
CPC ...... H04N 5/247; H04N 5/262; Y10S 901/01; Y10S 901/47; G06K 9/4604
See application file for complete search history.

(56) References Cited

U.S. PATENT DOCUMENTS

| | | | |
|---|---|---|---|
| 7,668,338 B2 | 2/2010 | Yoon et al. | |
| 8,218,816 B2 | 7/2012 | Sonoura | |
| 2006/0149455 A1* | 7/2006 | Sawada | B60T 7/22 701/96 |
| 2009/0154769 A1 | 6/2009 | Yoon et al. | |
| 2011/0172850 A1 | 7/2011 | Paz-Meidan et al. | |
| 2012/0131510 A1 | 5/2012 | Forstall et al. | |
| 2012/0323365 A1* | 12/2012 | Taylor | B25J 19/005 700/259 |
| 2013/0015984 A1* | 1/2013 | Yamashiro | G08G 1/22 340/988 |
| 2013/0041567 A1* | 2/2013 | Yamashiro | B60W 30/16 701/96 |
| 2016/0357262 A1* | 12/2016 | Ansari | G06Q 10/0833 |
| 2017/0083024 A1* | 3/2017 | Reijersen Van Buuren | G05D 1/0094 |

FOREIGN PATENT DOCUMENTS

| | | |
|---|---|---|
| JP | 2009-52940 A | 3/2009 |
| KR | 10-2003-0069112 A | 8/2003 |
| KR | 10-2005-0022551 A | 3/2005 |
| KR | 10-0612858 B1 | 8/2006 |
| KR | 10-2009-0062881 A | 6/2009 |
| KR | 10-2010-0120594 A | 11/2010 |
| KR | 10-2011-0039659 A | 4/2011 |
| KR | 10-1486308 B1 | 2/2015 |
| KR | 10-2015-0056115 A | 5/2015 |
| WO | WO-2017039546 A1 * | 3/2017 ........... G05D 1/0293 |

* cited by examiner

FOLLOWING SYSTEM FOR MOBILE ROBOT TO FOLLOW MOVING OBJECT

TECHNICAL FIELD

The present disclosure relates to a following system, and more particularly, to a following system in which a mobile robot follows a moving object.

BACKGROUND ART

In a following system, a mobile robot may follow a human such as a soldier or a vehicle via autonomous driving. The following system may be a global positioning system (GPS) type or a camera type.

In a GPS type following system, a mobile robot acquires a following path according to GPS information of a moving object. In such a following system, an appropriate following path may be obtained only when the GPS has high accuracy. Hereinafter, the appropriate following path denotes a path along which a mobile robot may avoid obstacles and at the same time may follow a moving object via the shortest distance.

Therefore, according to the GPS type following system, the appropriate following path may not be obtained in an area where the GPS has low accuracy.

In addition, a camera type following system has also been used, and in the camera type following system, a camera for observing a scene in front of a mobile robot is provided on the mobile robot and images from the camera are analyzed to acquire a following path. In this following system, an appropriate following path may be obtained even in an area where a GPS has low accuracy, but following problems may occur.

First, the mobile robot does not know about a circumstance in front of the moving object, and thus, an optimal following path may not be obtained in a long-term perspective.

Second, if the camera of the mobile robot may not capture images of the moving object due to a long distance between the moving object and the mobile robot, the mobile robot may not be able to acquire the following path.

Third, if captured images have low visibility at night or in a dark place, the mobile robot may not obtain an appropriate following path because the mobile robot may not recognize an obstacle in front of it.

The information in the background art described above was obtained by the inventors for the purpose of developing the present disclosure or was obtained during the process of developing the present disclosure. As such, it is to be appreciated that this information did not necessarily belong in the public domain before the patent filing date of the present disclosure.

DETAILED DESCRIPTION OF THE INVENTIVE CONCEPT

Technical Problem

One or more embodiments of the present disclosure provide a camera type following system capable of obtaining an optimal following path of a mobile robot in a long-term perspective.

One or more embodiments of the present disclosure provide a camera type following system capable of acquiring a following path of a mobile robot even in a case where a camera of the mobile robot is unable to capture images of a moving object because a distance between the moving object and the mobile robot increases.

One or more embodiments of the present disclosure provide a camera type following system capable of obtaining an appropriate following path of a mobile robot even in a case where captured images have low visibility at night or in a dark place.

Technical Solution

A following system according to an embodiment, in which a mobile robot follows a moving object, includes a first camera and a mobile robot.

The first camera is worn on the moving object to photograph a scene in front of the moving object.

The mobile robot includes a second camera for photographing a scene in front of the mobile robot, and obtains a following path according to a first front image from the first camera and a second front image from the second camera.

Advantageous Effects

According to a following system of one or more embodiments, a mobile robot acquires a following path according to a first front image from a first camera worn on a moving object and a second front image from a second camera included in the mobile robot.

Accordingly, the following system according to the embodiments may have following effects when comparing with a following system according to the related art.

First, the mobile robot may identify a circumstance in front of the moving object, and may obtain an optimal following path in a long-term perspective.

Second, if the second camera of the mobile robot is unable to photograph the moving object because a distance between the moving object and the mobile robot increases, the mobile robot extracts a past frame corresponding to a current location from among a series of frames of the first front image from the first camera, and obtains a following path pursuing the image of the extracted frame as a following target.

Therefore, even when the second camera of the mobile robot is unable to photograph the moving object due to the increased distance between the moving object and the mobile robot, the mobile robot may obtain the following path.

Third, when the photographed image has low visibility at night or in a dark place, the mobile robot may extract a past frame corresponding to a current location from among a series of frames of the first front image, and may combine an image of the extracted frame and an image of a current frame to obtain a following path according to an image of a result of the combining.

Therefore, even when the photographed image has low visibility at night or in a dark place, the mobile robot may obtain an appropriate following path.

BEST MODE

The following description and the attached drawings are provided for better understanding of the disclosure, and descriptions of techniques or structures related to the present disclosure which would be obvious to one of ordinary skill in the art will be omitted.

The specification and drawings should be considered in a descriptive sense only and not for purposes of limitation. Therefore, the scope of the present disclosure is defined by the appended claims. The terms and words which are used in the present specification and the appended claims should not be construed as being confined to common meanings or dictionary meanings but should be construed as meanings and concepts matching the technical spirit of the present disclosure in order to describe the present disclosure in the best fashion.

Hereinafter, one or more embodiments of the present invention will be described in detail with reference to accompanying drawings.

Figure 1:
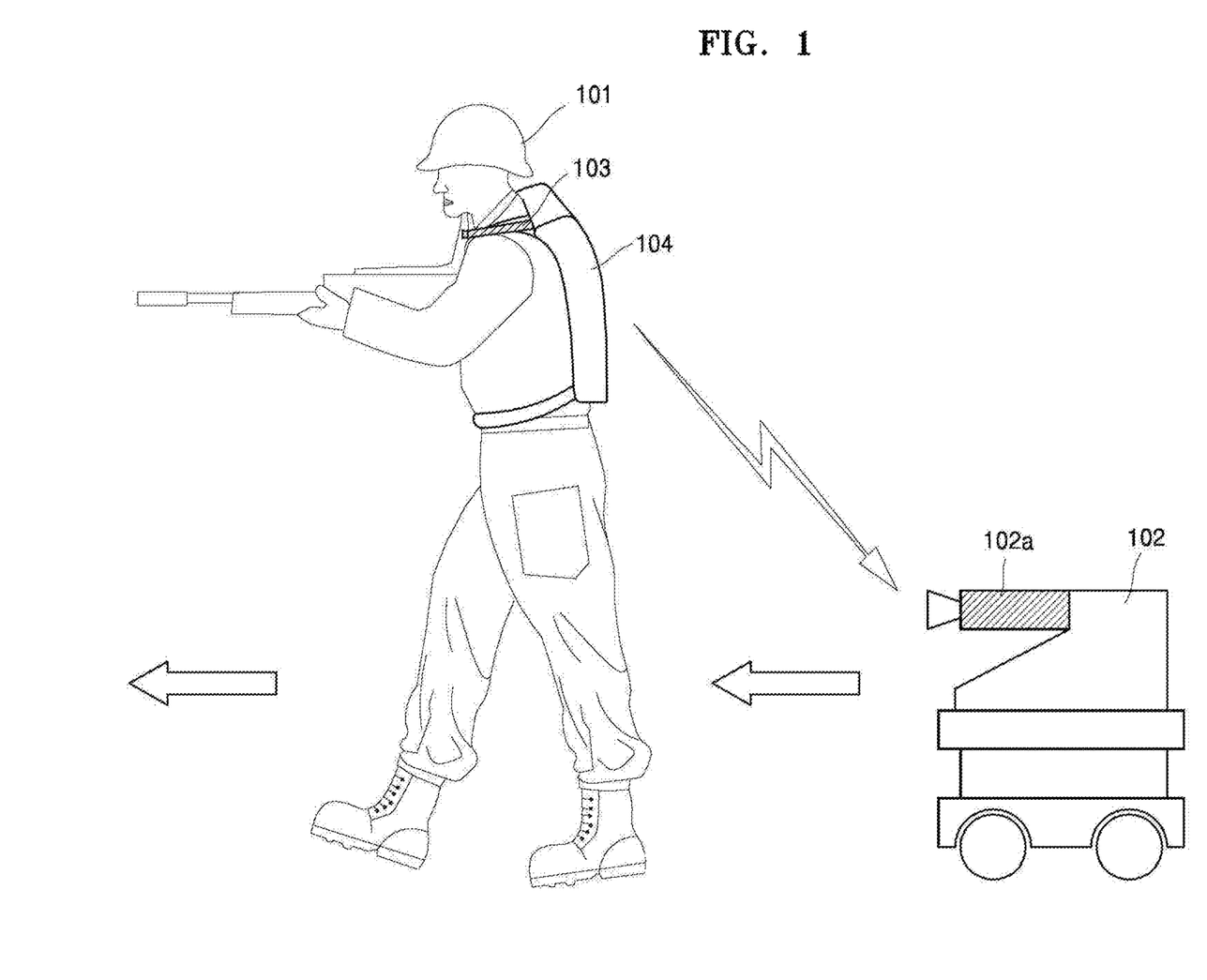
FIG. 1 is a diagram of a following system according to an embodiment of the present disclosure.

FIG. 1 shows a following system according to an embodiment of the present disclosure.

Referring to FIG. 1, the following system according to the present embodiment, in which a mobile robot 102 follows a moving object 101, e.g., a soldier or a vehicle, includes a first camera 103 and the mobile robot 102. The first camera 103 is worn on the moving object 101 to photograph a scene in front of the moving object 101. The mobile robot 102 includes a second camera 102a photographing a scene in front of the mobile robot, and obtains a following path according to a first front image from the first camera 103 and a second front image from the second camera 102a.

Accordingly, the following system according to the present embodiment may have following effects when comparing with a following system according to the related art.

First, the mobile robot 102 may identify a circumstance in front of the moving object 101, and may obtain an optimal following path in a long-term perspective.

Second, if the second camera 102a of the mobile robot 102 is unable to photograph the moving object 101 because a distance between the moving object 101 and the mobile robot 102 increases, the mobile robot 102 extracts a past frame corresponding to a current location from among a series of frames of the first front image from the first camera 103, and obtains a following path pursuing the image of the extracted frame as a following target through panning and tilting of the second camera 102a.

Therefore, even when the second camera 102a of the mobile robot 102 is unable to photograph the moving object 101 due to the increased distance between the moving object 101 and the mobile robot 102, the mobile robot 102 may obtain the following path.

Third, when the photographed image has low visibility at night or in a dark place, the mobile robot 102 may extract a frame at a past time point corresponding to a current location, from among a series of frames of the first front image, and may combine an image of the extracted frame and an image of a current frame to obtain a following path according to an image of a result of the combining.

Therefore, even when the photographed image has low visibility at night or in a dark place, the mobile robot 102 may obtain an appropriate following path.

A user controls operations of the mobile robot 102 and transmits the first front image from the first camera 103 to the mobile robot 102, by using a remote control device 104 worn on the moving object 101.

Figure 2:
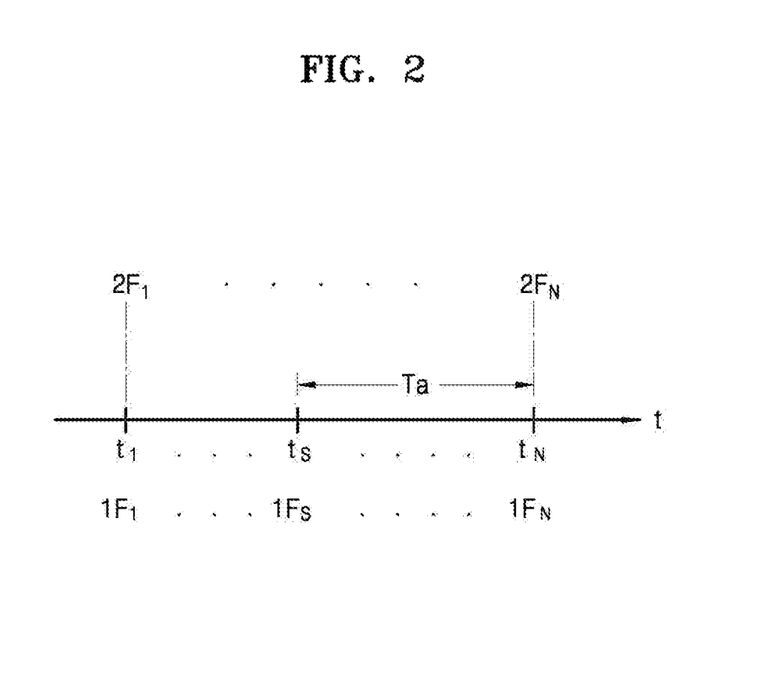
FIG. 2 is a diagram illustrating a method of using a first front image from a first camera and a second front image from the second camera in the following system of FIG. 1.

FIG. 2 is a diagram illustrating a method of using a first front image from the first camera 103 and a second front image from the second camera 102a in the following system of FIG. 1. In FIG. 2, reference numeral t denotes time, $1F_1$ to $1F_N$ denote frames of the first front image, $2F_1$ to $2F_N$ denote frames of the second front image, and Ta denotes an estimated arrival time.

Referring to FIGS. 1 and 2, the mobile robot 102 extracts a frame $1F_s$ of a past time point $t_s$ corresponding to a current location, from among a series of frames $1F_1$ to $1F_N$ of the first front image from the first camera 103. This will be described in more detail as follows.

First, the mobile robot 102 searches for a past location where the mobile robot 102 has been located at the past time point $t_s$ when the moving object 101 has been located at a current location of the mobile robot 102.

Next, the mobile robot 102 calculates an estimated arrival time Ta taken for the mobile robot 102 to reach the current location from the past location.

In addition, the mobile robot 102 extracts a frame $1F_s$ at the past time point corresponding to the estimated arrival time Ta from among the series of frames $1F_1$ to $1F_N$ of the first front image.

The extracted frame $1F_s$ at the past time point of the first front image may be used as follows.

First, the mobile robot 102 combines an image of the frame $1F_s$ at the past time point of the first front image with an image of a frame $2F_N$ at a current time point $t_N$ in the second front image, and obtains a following path according to a result of the combined image.

Therefore, even when the photographed image has low visibility at night or in a dark place, the mobile robot 102 may obtain an appropriate following path.

Second, when the second camera 102a of the mobile robot is unable to photograph the moving object 101 due to the increased distance between the moving object 101 and the mobile robot 102, the mobile robot 102 obtains a following path, a following target of which is the image of the frame $1F_s$ at the past time point in the first front image, via panning and tilting of the second camera 102a.

Therefore, even when the second camera 102a of the mobile robot 102 is unable to photograph the moving object 101 due to the increased distance between the moving object 101 and the mobile robot 102, the mobile robot 102 may obtain the following path.

Figure 3:
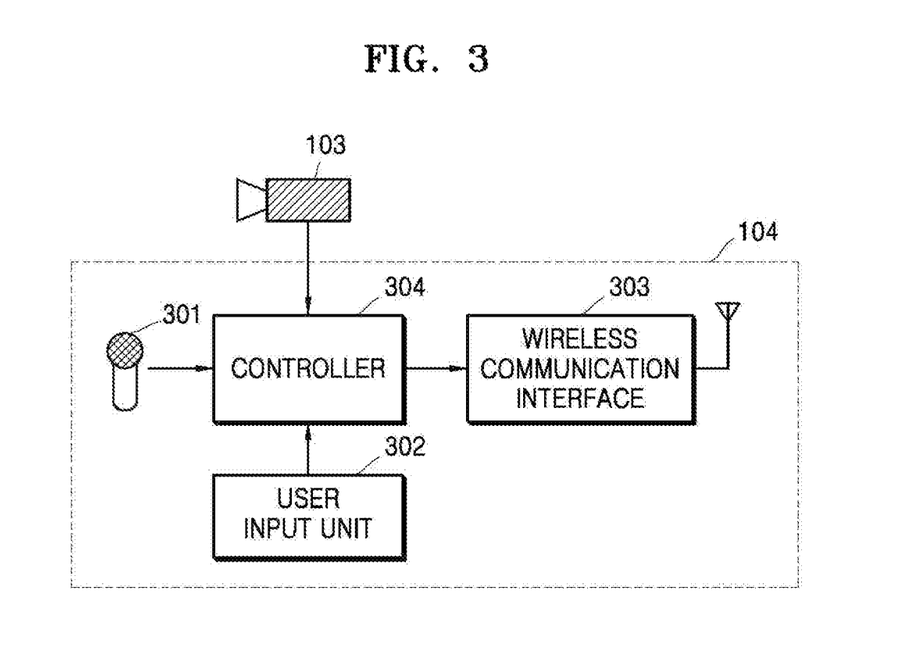
FIG. 3 is a block diagram of a remote control device of FIG. 1.

FIG. 3 shows a configuration of a remote control device 104 of FIG. 1.

Referring to FIGS. 1 and 3, the remote control device 104 includes a microphone 301, a user input unit 302, a wireless communication interface 303, and a controller 304.

The microphone 301 generates an audio signal.

The user input unit 302, e.g., a joystick, generates an operation control signal for controlling operations of the mobile robot 102 according to manipulation of the user.

The wireless communication interface 303 relays communication with the mobile robot 102.

Figure 4:
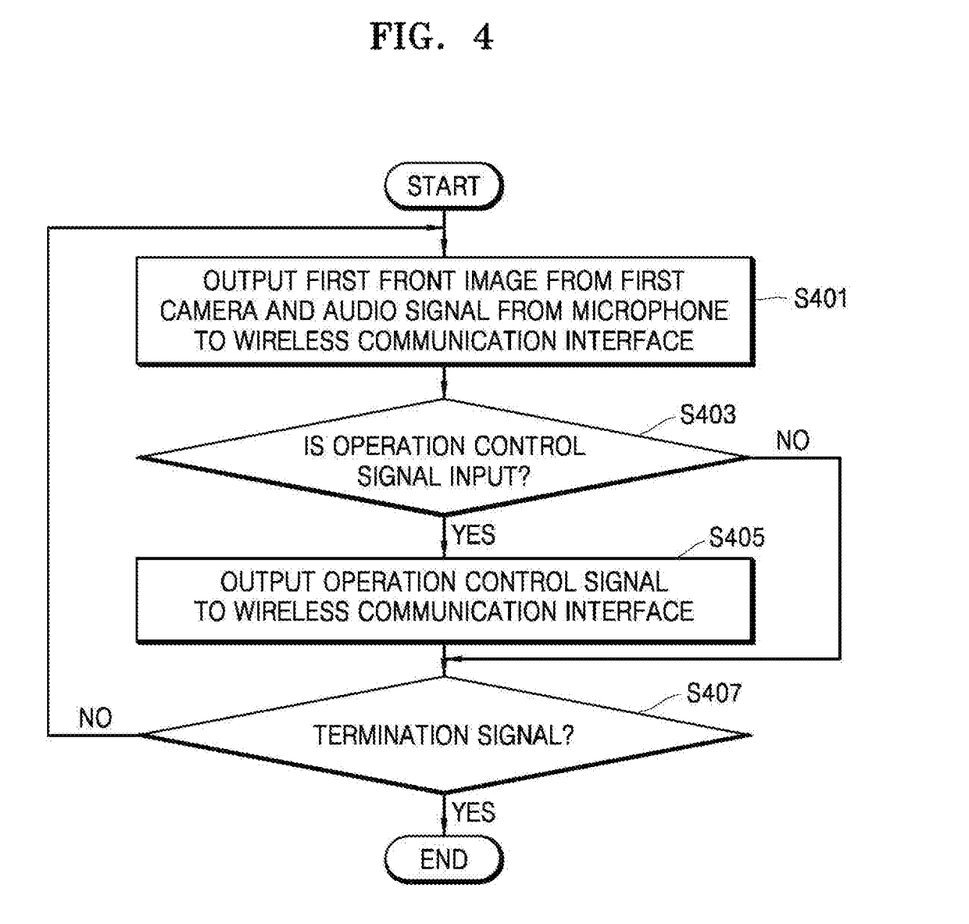
FIG. 4 is a flowchart illustrating operations of a controller of FIG. 3.

FIG. 4 shows operations of the controller 304 of FIG. 3. This will be described below with reference to FIGS. 1, 3, and 4.

The controller 304 outputs the first front image from the first camera 103 and the audio signal from the microphone 301 to the wireless communication interface 303 (S401). Accordingly, the wireless communication interface 303 transmits the first front image and the audio signal from the controller 304 to the mobile robot 102.

When the operation control signal is input from the user input unit 302 (S403), the controller 304 outputs the operation control signal to the wireless communication interface 303 (S405). Accordingly, the wireless communication interface 303 transmits the operation control signal from the controller 304 to the mobile robot 102.

The above processes S401 to S405 are repeatedly performed until a termination signal, e.g., a power off (Off) signal is generated (S407).

Accordingly, the mobile robot 102 may obtain the following path according to the first front image, the second front image, and the audio signal.

Here, the audio signal may include an audio signal regarding the duty of the mobile robot 102. In this case, the mobile robot 102 executes the duty according to the audio signal.

Figure 5:
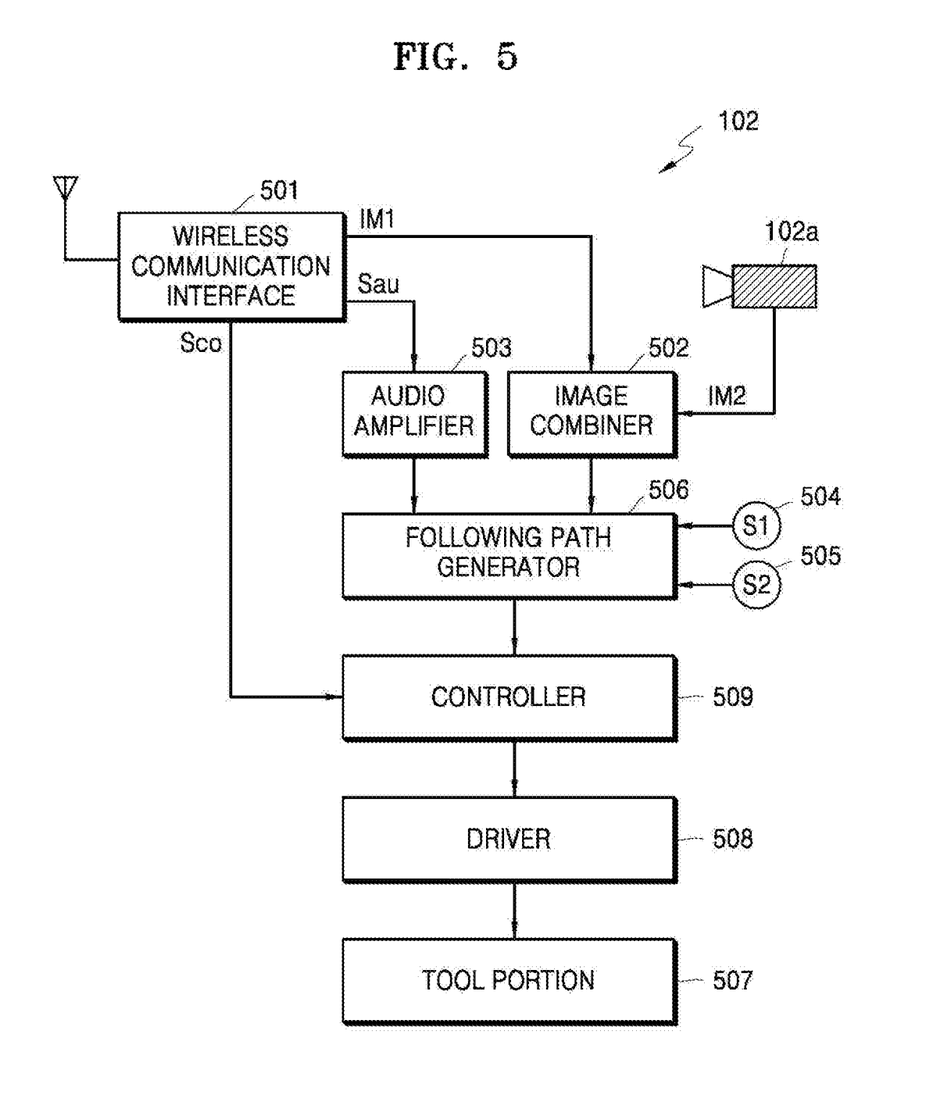
FIG. 5 is a block diagram of a mobile robot of FIG. 1.

FIG. 5 shows a configuration of the mobile robot 102 of FIG. 1. Structure of the mobile robot 102 and operations of each element in the mobile robot 102 will be described below with reference to FIGS. 1 and 5.

The mobile robot 102 includes a wireless communication interface 501, an image combiner 502, an audio amplifier 503, a first ultrasound sensor 504 (S1), a second ultrasound sensor 505 (S2), a following path generator 506, a tool portion 507, a driver 508, and a controller 509.

The wireless communication interface 501 receives the first front image, the audio signal, and the operation control signal from the remote control device 104.

The image combiner 502 generates a combined image by combining the first front image IM1 from the wireless communication interface 501 and the second front image IM2 from the second camera 102a.

The audio amplifier 503 amplifies an audio signal Sau from the wireless communication interface 501.

The first ultrasound sensor 504 (S1) generates a ground state signal of a front left portion of the mobile robot 102.

The second ultrasound sensor 505 (S2) generates a ground state signal of a front right portion of the mobile robot 102.

The following path generator 506 obtains the following path according to the combined image from the image combiner 502, the audio signal from the audio amplifier 503, the ground state signal of the front left portion from the first ultrasound sensor 504 (S1), and the ground state signal of the right front portion from the second ultrasound sensor 505 (S2). Therefore, an appropriate following path may be obtained rapidly when comparing with the following system using a single camera according to the related art.

The tool portion 507 is provided to operate the mobile robot.

The driver 508 drives the tool portion 507.

The controller 509 controls the driver 508 according to the following path from the following path generator 506 or the operation control signal Sco from the wireless communication interface 501.

Hereinafter, operations of the image combiner 502, the following path generator 506, and the controller 509 will be described in detail.

Figure 6:
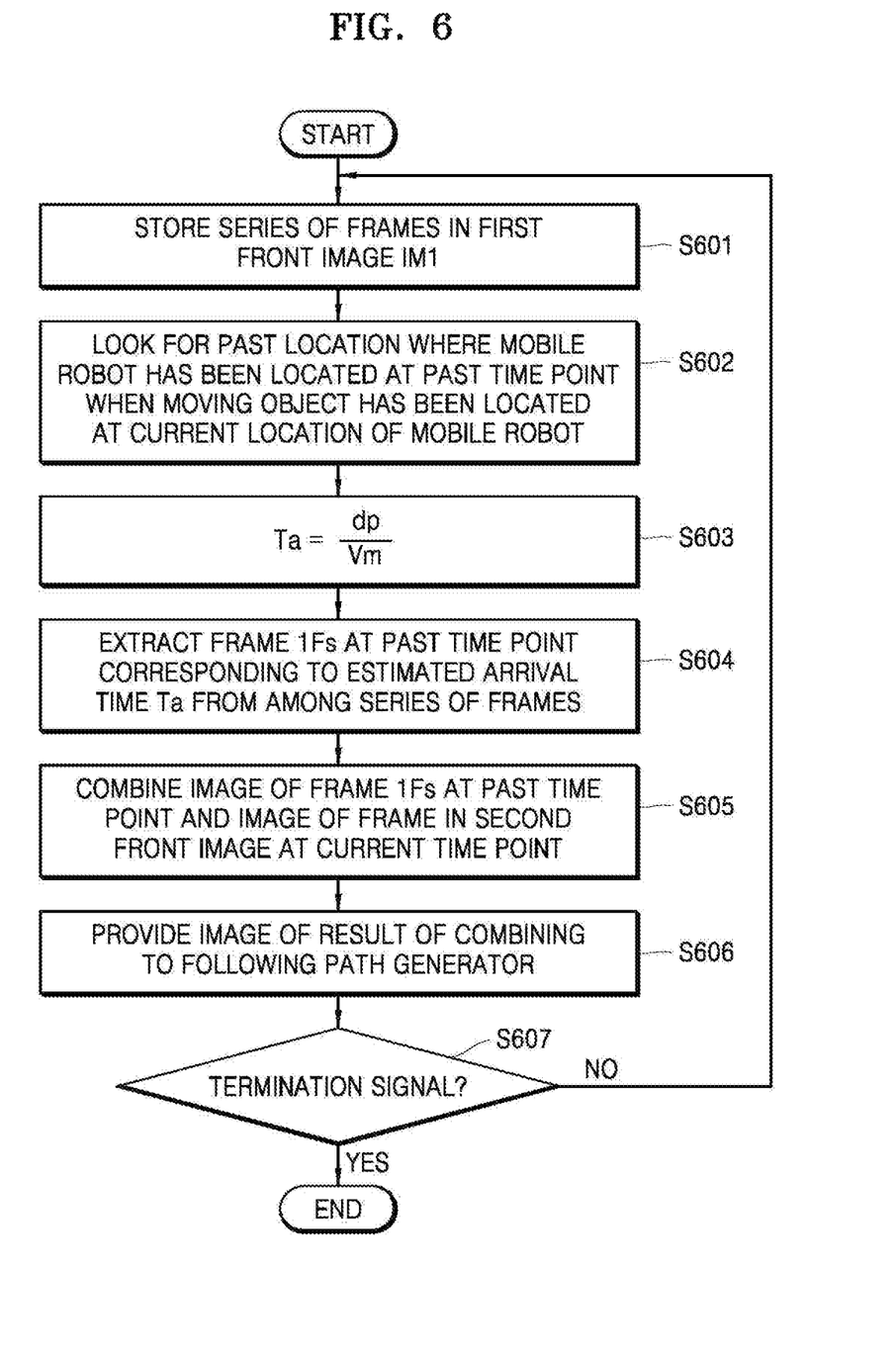
FIG. 6 is a flowchart illustrating operations of an image combiner of FIG. 5.

FIG. 6 illustrates operations of the image combiner 502 of FIG. 5. This will be described below with reference to FIGS. 2, 5, and 6.

The image combiner 502 stores a series of frames 1F1 to 1FN of the first front image IM1 (S601).

Also, the image combiner 502 searches for a past location where the mobile robot 102 was located at the past time point $t_S$ when the moving object 101 was located at a current location of the mobile robot 102 (S602).

Next, the image combiner 502 calculates an estimated arrival time Ta taken for the mobile robot 102 to reach the current location from the past location (S603). The estimated arrival time Ta may be calculated by following Equation 1.

$$Ta = \frac{dp}{Vm} \qquad \text{[Equation 1]}$$

In above Equation 1, "dp" denotes a distance between the past location and the current location, and "Vm" denotes an average moving velocity applied to moving from the past location to the current location.

Next, the image combiner 502 extracts a frame 1Fs at the past time point corresponding to the estimated arrival time Ta from among the series of frames $1F_1$ to $1F_N$ of the first front image IM1 (S604).

Next, the image combiner 502 combines the image of the frame 1Fs at the past time point in the first front image IM1 and the image of the frame $2F_N$ at the current time point $t_N$ in the second front image IM2 (S605).

In addition, the image combiner 502 provides the following path generator 506 with an image of the result of the combining (S606).

The above operations S601 to S606 are repeatedly performed until a termination signal is generated.

Figure 7:
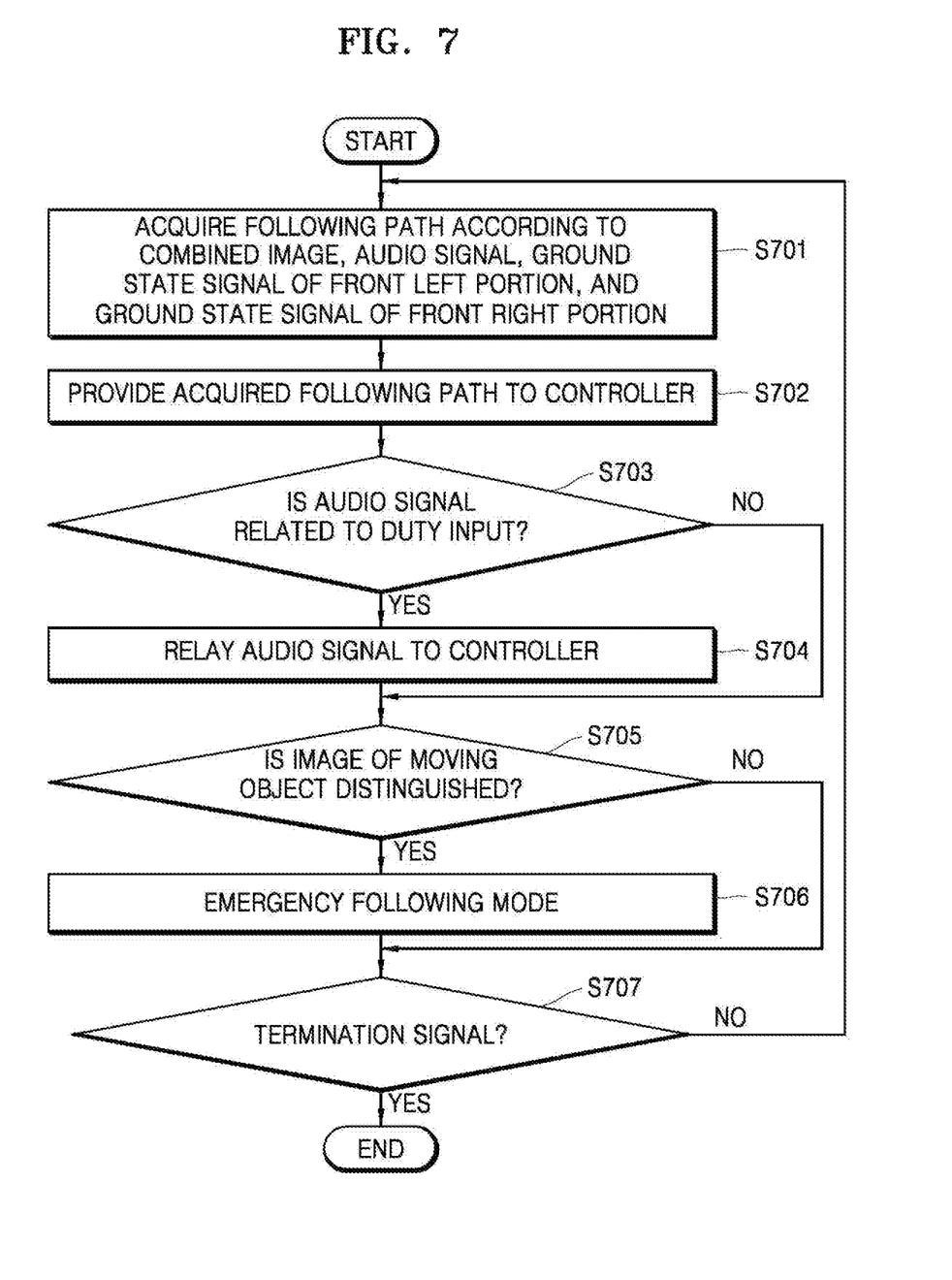
FIG. 7 is a flowchart illustrating operations of a following path generator of FIG. 5.

FIG. 7 illustrates operations of the following path generator 506 of FIG. 5. This will be described below with reference to FIGS. 1, 5, and 7.

The following path generator 506 obtains the following path according to the combined image from the image combiner 502, the audio signal from the audio amplifier 503, the ground state signal of the front left portion from the first ultrasound sensor 504 (S1), and the ground state signal of the right front portion from the second ultrasound sensor 505 (S2) (S701).

Examples of the following path setting operation of the following path generator 506 regarding the audio signal will be described as follows.

First, the following path generator 506 may estimate a ground state where the moving object 101 is located, by analyzing a sound pattern of a footstep of the moving object 101, e.g., a soldier. For example, the sound pattern is "splashing sound", the following path generator 506 obtains the following path taking into account that there is a deep waterway at the location of the moving object 101. If the sound pattern is "dabbling sound", the following path generator 506 obtains the following path taking into account that there is a shallow waterway at the location of the moving object 101. If the sound pattern is "trotting sound", the following path generator 506 obtains the following path taking into account that the moving object 101 is walking fast. If the sound pattern is "sinking sound" in mud, the following path generator 506 obtains the following path taking into account that the moving object 101 is walking on a muddy road.

Second, the following path generator 506 obtains the following path based on command voice of the moving object 101. Examples of the command voice of the moving object 101 may include "watch your right," "come slow," "be quiet," and "hurry up."

The following path generator 506 provides the following path to the controller 509 (S702).

Also, when an audio signal related to the duty of the mobile robot 102 is input (S703), the following path generator 506 relays the audio signal to the controller 509 (S704).

Examples of the audio signal related to the duty will be described as follows.

First, as peripheral sound of the moving object 101, "clank sound" is the sound of operating guns by the moving object 101.

Second, as peripheral sound of the moving object 101, "boom sound" is the sound of exploding bombs.

Third, as peripheral sound of the moving object 101, "whistling sound" is the sound of strong wind.

Fourth, certain command voice of the moving object 101 may be an audio signal related to the duty.

In addition, when an image of the moving object is distinguished (S705), the following path generator 506 performs an emergency following mode (S706).

The above operations S701 to S706 are repeatedly performed until a termination signal is generated (S707).

Figure 8:
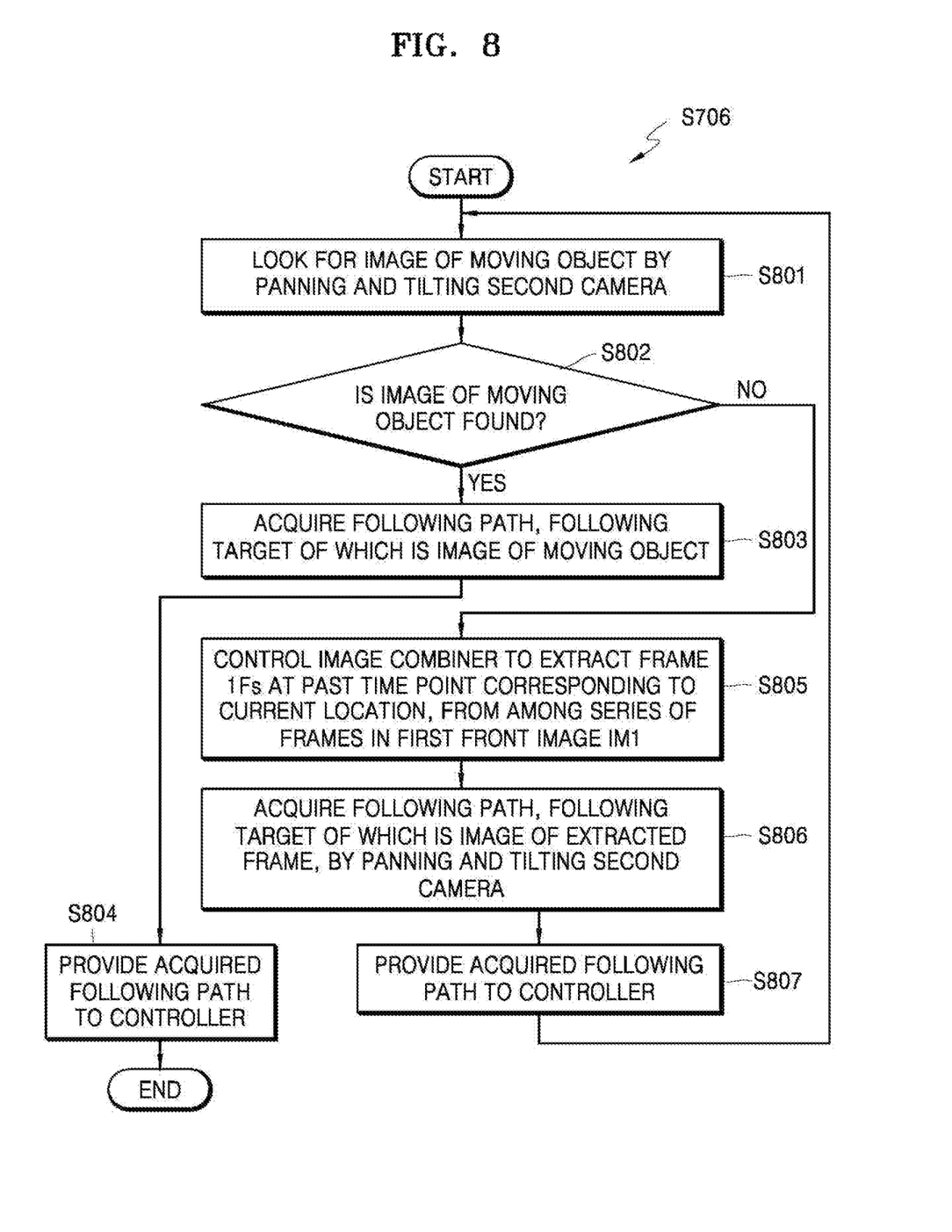
FIG. 8 is a flowchart illustrating operations in an emergency following mode of FIG. 7.

FIG. 8 illustrates operations of the emergency following mode (S706) of FIG. 7. This will be described below with reference to FIGS. 1, 2, 5, and 7.

The following path generator 506 searches for the image of the moving object 101 by panning and tilting the second camera 102a (S801).

When the image of the moving object 101 is found (S802), the following path generator 506 obtains a following path, a following target of which is the image of the moving object 101 (S803). Also, the following path generator 506 provides the controller 509 with the acquired following path (S804).

When the image of the moving object 101 is not found (S802), the following path generator 506 performs operations S805 to S807, and then, performs operation of S802 and operations after that again.

In operation S805, the following path generator 506 controls the image combiner 502 extracts the frame 1Fs at the past time point $t_S$ corresponding to the current location, from among the series of frames $1F_1$ to $1F_N$ in the first front image IM1 from the first camera 103. This operation S805 is performed through operations S602 to S604 of FIG. 6.

Next, the following path generator 506 obtains the following path, the following target of which is the image of the extracted frame, by panning and tilting the second camera 102a (S806).

Next, the following path generator 506 provides the controller 509 with the acquired following path (S807), and performs operation S802 and operations after that again.

Figure 9:
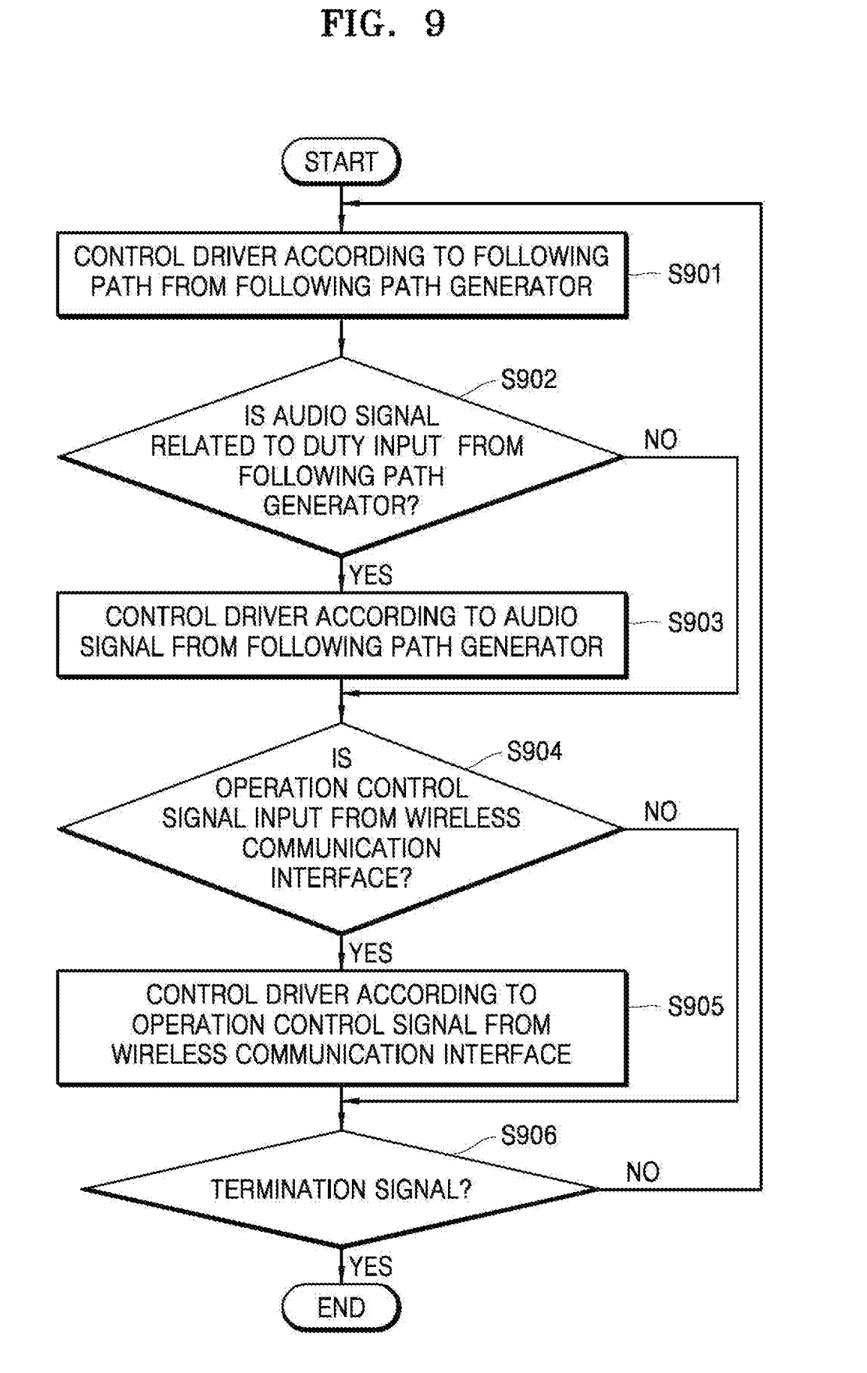
FIG. 9 is a flowchart illustrating operations of a controller of FIG. 5.

FIG. 9 shows operations of the controller 509 of FIG. 5. This will be described below with reference to FIGS. 1, 5, and 9.

The controller 509 controls the driver 508 according to the following path provided from the following path generator 506 (S901).

Next, when the audio signal related to the duty is input from the following path generator 506 (S902), the controller 509 controls the driver 508 according to the audio signal from the following path generator 506 (S903).

Also, when an operation control signal is input from the wireless communication interface 501 (S904), the controller 509 controls the driver 508 according to the operation control signal from the wireless communication interface 501 (S905).

The above operations S901 to S906 are repeatedly performed until a termination signal is generated.

MODE OF THE INVENTION

In addition, as another embodiment of the present disclosure, a following system in which the mobile robot 102 (see FIG. 1) follows a plurality of moving objects may be provided. Referring to FIG. 1, the following system according to another embodiment of the present disclosure includes first cameras 103 and the mobile robot 102.

The first cameras 103 are respectively worn on the moving objects 101 to photograph a scene in front of the moving objects 101.

The mobile robot 102 includes the second camera 102a for photographing a scene in front of the mobile robot 102, and acquires a following path according to first front images from the first cameras 103 and the second front image from the second camera 102a.

Here, the above descriptions with reference to FIGS. 1 to 9 may be applied equally to the present embodiment, and differences from the previous descriptions will be described below.

Figure 10:
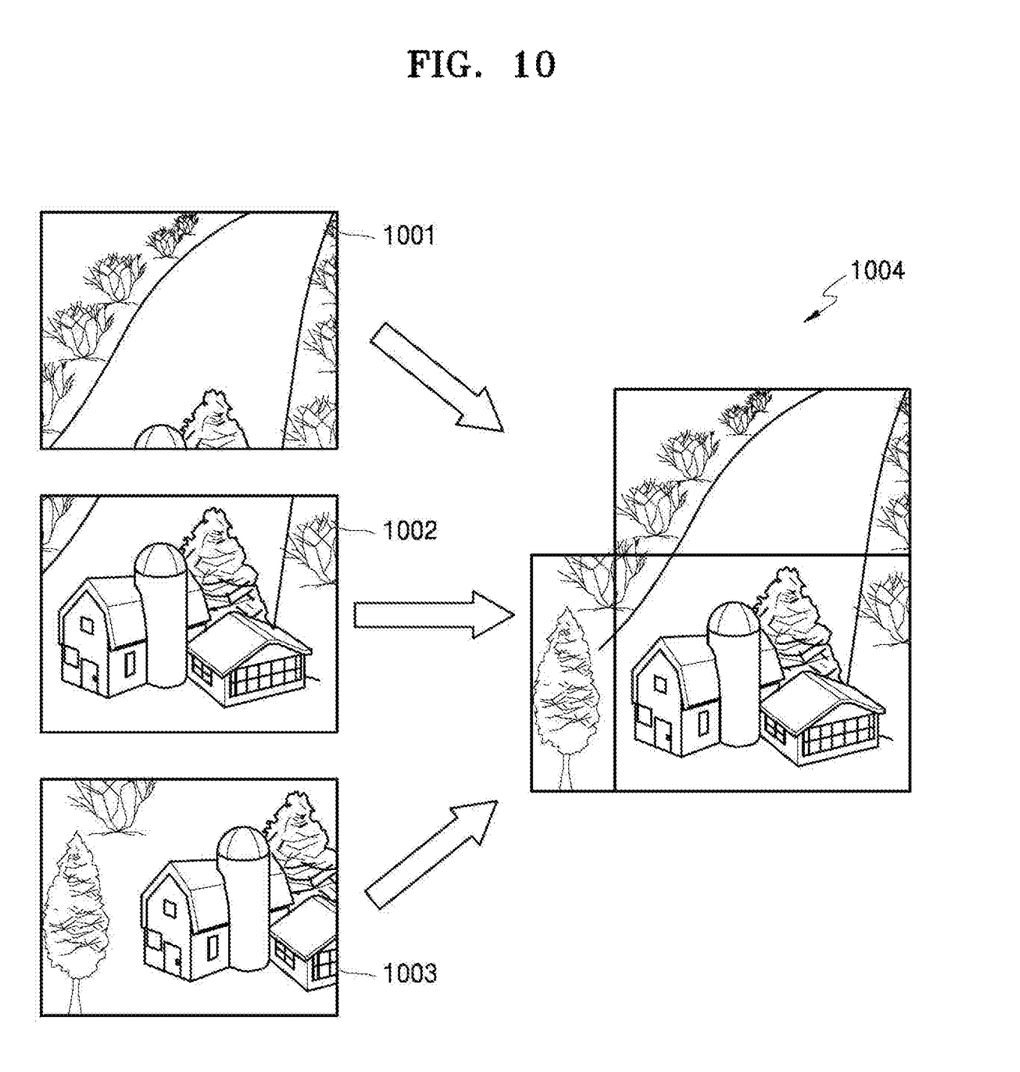
FIG. 10 is a diagram illustrating generation of a panorama image in a following system in which a mobile robot follows a plurality of moving objects.

FIG. 10 is a diagram illustrating generation of a panorama image in a following system in which a mobile robot follows a plurality of moving objects.

Referring to FIG. 10, the mobile robot 102 generates a panorama image 1004 of first front images 1001 and 1003 from the first cameras 103 and a second front image 1002 from the second camera 102a, and then, obtains a following path according to the panorama image 1004.

Since the following path is obtained according to the panorama image 1004 as described above, the mobile robot 102 may obtain more appropriate following path.

Here, the panorama image 1004 is generated based on the second front image 1002 from the second camera 102a. The first images 1001 and 1003 from the first cameras 103 are extracted through the execution of the operations S602 to S604 illustrated in FIG. 6.

As described above, according to the following system of the present embodiment, the mobile robot obtains the following path according to the first front image from the first camera worn on the moving object and the second front image from the second camera provided in the mobile robot.

Accordingly, the following system according to the present embodiment may have following effects when comparing with a following system according to the related art.

First, the mobile robot may know about a circumstance in front of the moving object, and thus, an optimal following path may be obtained in a long-term perspective.

Second, in a case where the second camera of the mobile robot is unable to photograph the mobile robot because a distance between the moving object and the mobile robot increases, the mobile robot extracts a frame at a past time point corresponding to a current location, from among a series of frames in the first front image of the first camera, and may obtain a following path, a following target of which is the image of the extracted frame.

Therefore, if the camera of the mobile robot may not capture images of the moving object due to the increased distance between the moving object and the mobile robot, the mobile robot may obtain the following path.

Third, when the photographed image has low visibility at night or in a dark place, the mobile robot may extract a past frame corresponding to a current location from among a series of frames of the first front image, and may combine an image of the extracted frame and an image of a current frame to obtain a following path according to an image of a result of the combining.

Therefore, even when the photographed image has low visibility at night or in a dark place, the mobile robot may acquire an appropriate following path.

While this disclosure has been particularly shown and described with reference to preferred embodiments thereof, it will be understood by those skilled in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

INDUSTRIAL APPLICABILITY

The present disclosure may be used in various following systems.

The invention claimed is:

1. A following system in which a mobile robot follows a moving object, the following system comprising:
   a first camera worn on the moving object and configured to photograph a scene in front of the moving object; and
   the mobile robot comprising a second camera configured to photograph a scene in front of the mobile robot, and to acquire a following path according to a first front image from the first camera and a second front image from the second camera,
   wherein, in a case where an image of the moving object is not found, the mobile robot is configured to extract a frame of a past time point corresponding to a current location, from among a series of frames in the first front image, and to obtain a following path, in which an image of the extracted frame is a following target, through panning and tilting the second camera.

2. A following system in which a mobile robot follows a moving object, the following system comprising:
   a first camera worn on the moving object and configured to photograph a scene in front of the moving object; and
   the mobile robot comprising a second camera configured to photograph a scene in front of the mobile robot, and to acquire a following path according to a first front image from the first camera and a second front image from the second camera,
   wherein the mobile robot is further configured to store a series of frames in the first front image from the first camera, search for a past location where the mobile robot was located at a past time point when the moving object was located at a current location of the mobile robot, calculate an estimated arrival time taken for the mobile robot to reach the current location from the past location, extract a frame at a past time point corresponding to the estimated arrival time, from among the series of frames, combine an image of the frame at the past point and an image of a frame at a current point in the second front image, and obtain a following path according to an image of a result of the combining.

3. A following system in which a mobile robot follows a moving object, the following system comprising:
   a first camera worn on the moving object and configured to photograph a scene in front of the moving object;
   the mobile robot comprising a second camera configured to photograph a scene in front of the mobile robot, and to acquire a following path according to a first front image from the first camera and a second front image from the second camera; and
   a remote control device worn by the moving object and configured to control operations of the mobile robot according to manipulation by a user,
   wherein the remote control device is further configured to transfer the first front image from the first camera to the mobile robot.

4. The following system of claim 3, wherein the remote control device comprises:
   a microphone configured to generate an audio signal;
   a user input unit configured to generate an operation control signal for controlling operations of the mobile robot according to manipulation by the user;
   a wireless communication interface configured to relay communication with the mobile robot; and
   a controller.

5. The following system of claim 4, wherein the controller of the remote control device is configured to output the first front image from the first camera, the audio signal from the microphone, and the operation control signal from the user input unit to the wireless communication interface, and
   the wireless communication interface is further configured to transfer the first front image, the audio signal, and the operation control signal from the controller to the mobile robot.

6. The following system of claim 5, wherein the mobile robot is further configured to obtain a following path according to the first front image, the second front image, and the audio signal.

7. The following system of claim 6, wherein
   the audio signal comprises an audio signal related to execution of a duty, and
   the mobile robot is further configured to execute the duty according to the audio signal.

8. A following system in which a mobile robot follows a plurality of moving objects, the following system comprising:
   first cameras respectively worn by the plurality of moving objects and configured to photograph a scene in front of the plurality of moving objects; and
   the mobile robot comprising a second camera configured to photograph a scene in front of the mobile robot, and acquiring a following path according to first front images from the first cameras and a second front image from the second camera,
   wherein the mobile robot is further configured to generate the first front images and a panorama image of the second front image from the second camera, and obtain a following path according to the panorama image.

9. The following system of claim 8, wherein the panorama image is generated based on the second front image from the second camera.

* * * * *